Patented Aug. 16, 1938

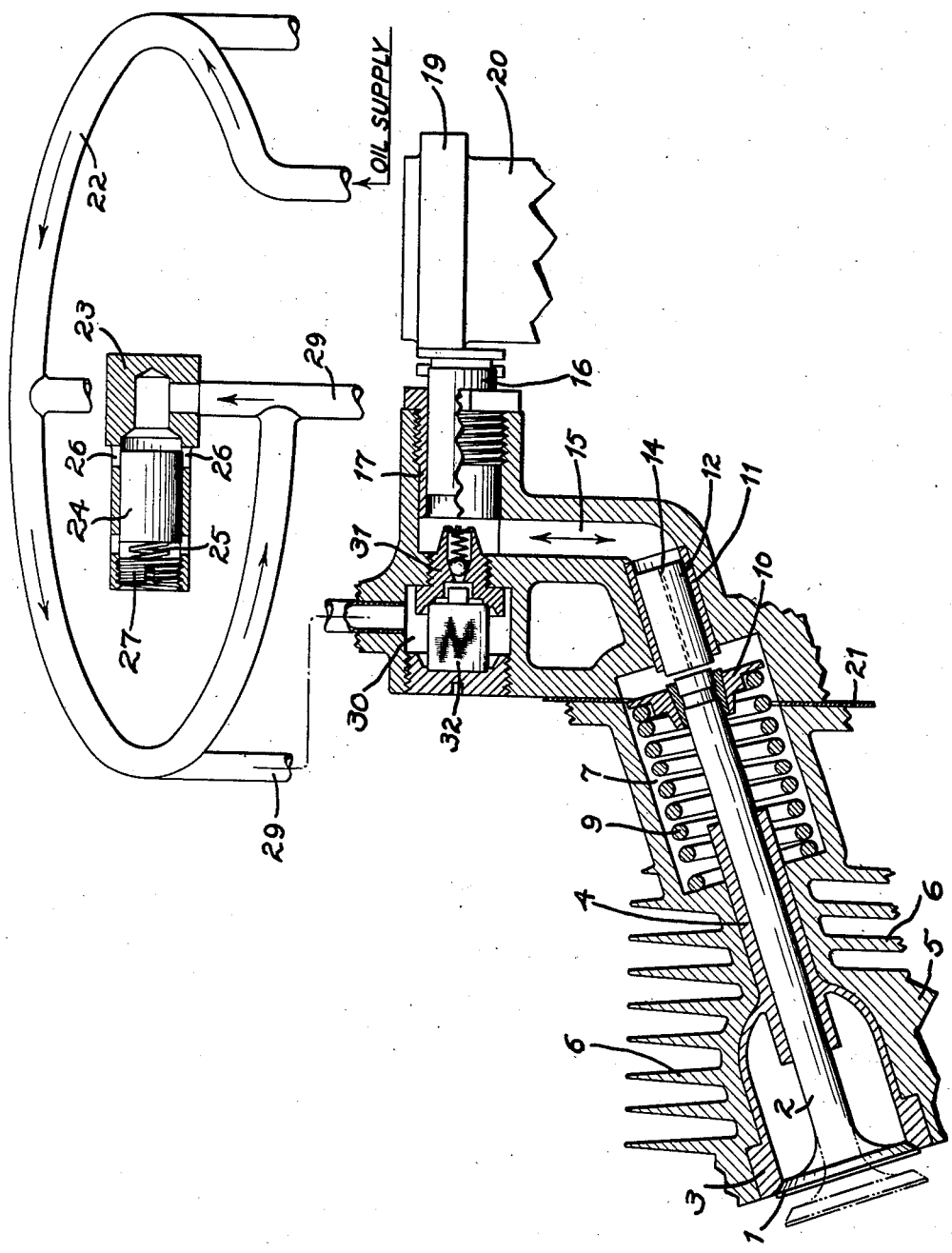

2,126,885

UNITED STATES PATENT OFFICE 2,126,885

VALVE GEAR

Ralph M. Heintz, San Francisco, Calif., assignor, by mesne assignments, to Bendix Aviation Corporation, South Bend, Ind., a corporation of Delaware Application February 25, 1936, Serial No. 65,638
Renewed June 16, 1938

2 Claims. (Cl. 123—90)

My invention relates to valve gear, and more particularly to a system wherein valves are operated hydraulically.

Among the objects of my invention are: To provide a valve gear wherein poppet valves may be operated at an angle to an engine cylinder; to provide a hydraulically operated poppet valve; to provide a means and method of eliminating air in a hydraulic valve-lifting system; to provide a means and method of lubricating a valve stem; to provide a means and method of preventing oil fouling of a valve stem and guide, to provide valve gear of relatively small inertia; and to provide a simple and effective valve-lifting system.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, if any way, to the apparatus of the present application, as I may adopt various other apparatus embodiments, utilizing the method, within the scope of the appended claims.

Referring to the drawing:

The figure is a view partly in section and partly in elevation of a preferred valve-lifting system, built in accordance with my invention. Certain parts have been simplified for ease of illustration.

Recently it has become relatively common in the art to utilize hydraulic valve clearance take-ups, but these arrangements do not, in any way, eliminate many bad features of the purely mechanical valve operating means, especially when the valves are applied to internal combustion engines. In this respect I wish to point out that my invention herein to be described, while described as primarily adaptable for use in conjunction with an internal combustion engine, can be used in other devices, such as air compressors for example; and furthermore, the valve itself, while shown to be a poppet valve, may, within the knowledge of those skilled in the art, be of other types. I do not wish, therefore, to be limited to an internal combustion engine valve gear, as the advantages of my invention are equally applicable to other devices.

In the ordinary valve setup wherein the valve is mechanically lifted through the agency of a tappet and push rod, certain limitations are inherent, particularly when applied to a radial engine. For example, if it is desired to place the valves in a radial engine having an L-head, at an angle, particularly where the cylinders are not all in the same plane, the valve gear becomes intricate, and it has heretofore been customary in such radial engines to utilize, primarily for the reason given immediately above, overhead valves, thus losing the advantages of an L-head. Tilted valves, however, in an L-head radial engine have definite advantages if the engine is to be air-cooled, inasmuch as by tilting the valve, stem and guide can be separated from the engine cylinder and cooling applied to both sides thereof.

I have therefore invented a hydraulic system which will allow valves in an internal combustion engine or other device to be set at different levels or even at different angles on the same engine and yet have the tappets all positioned in the same plane; and my invention also broadly comprises means for maintaining the oil transmission column at a constant pressure, and a means and method for eliminating or preventing air bubbles from entering this column. Furthermore, I may desire to continually bleed the oil column and to use the oil thus obtained to lubricate valve stems.

I also prefer to provide a chamber back of the valve stem and guide so that pressures may be equalized on both ends of the valve stem, thus avoiding oil pumping around the inlet valve stem and a complete drying up and carbonization of oil around the exhaust valve stem.

Other broad aspects of my invention may be more fully understood by direct reference to the drawing. A poppet valve assembly is provided with a valve head 1 supported on a stem 2. This valve is the conventional type of valve commonly used in internal combustion engines, and is supported by a combined unitary seat 3 and guide 4, as described in my application, Serial No. 65,472 filed February 24, 1936 contemporaneously with the present application, entitled Valve seat and guide.

The valve seat and guide is preferably imbedded in the cylinder block 5 in such a manner that it is at an angle to a cylinder, not shown, this angle, however, being such that air-cooling fins 6—6 may be provided completely surrounding the valve guide 4. The stem 2 of the valve extends through the guide into a spring chamber 7 containing a valve spring 9 compressed to exert pressure to close the valve through the medium of spring retainer 10. The chamber completely surrounds the spring and is provided at the bottom with a lifter bearing 11, preferably of hardened material, in which a lifter 12 slides, and the lifter 12 is preferably provided with a bleeder hole 14 through the center, the use of which will be described later.

From the back of the lifter 12 extends an oil channel 15 in which oil oscillates, being energized by a tappet 16 operating in a hardened bearing 17, this tappet being driven by a cam 19 mounted on a cam shaft 20, which is driven in any convenient manner, as is well known in the art, from the crank shaft of the engine to which the cylinders and valves are attached. In case access is desired to the valve chamber, I have split the cylinder casting in such a manner that the split passes through the chamber, and have inserted therebetween a gasket 21 to seal the chamber, the two portions being held together by bolts or clamps, as is well known in the art.

One of the important features of my invention lies in the means and method by which I supply oil to the oil column which is contained within oil channel 15. Inasmuch as the system herein described is adapted for use with a four-cylinder radial engine operating with the cylinders in the horizontal plane, I prefer to connect the main oil supply to a circular conduit 22, also in a horizontal plane. The conduit 22, after almost completing a circle, ends in a pressure relief valve assembly 23 which, as is well known in the art, comprises a piston 24 positioned to be pushed against a spring 25, thus uncovering more or less of apertures 26 in accordance with the pressure. The pressure can be regulated by means of a spring-tension nut 27 so that when a given pressure is reached within conduit 22, oil is released through apertures 26 to reduce the pressure. I also prefer to utilize the released oil to lubricate other portions of the engine.

Vertical risers 29 are dropped from the oil conduit 22, which connect with a filter chamber 30 through which oil is released into the oil channel 15 through a check-valve assembly 31, first, however, having passed through a filter screen 32.

I prefer to make this filter screen either of multiple layers of mesh material or of single mesh of such a size that an air globule, to pass through, must be smaller than .0001" in diameter. Even with low viscosity oil at running temperature, the surface tension is so high that an oil line pressure of thirty pounds per square inch, for example, cannot force these small globules through the filter. When enough globules have joined to make one large enough to break the cohesion with the surface of the filter, the air bubble will rise in the vertical pipe 29 and be washed out with the main oil stream in oil conduit 22, thus preventing air from entering the oil channel 15 during operation.

Inasmuch as the important thing to consider in a hydraulic drive of this sort is the elimination of trapped air, the bleeding of freed air and the flushing of the lines, the entire system has been designed toward eliminating air. It has already been described how air is prevented from entering the oil channel 15, but if by any chance air should be left in this channel after servicing, for example, it will work out through bleeder hole 14 in the lifter 12.

This bleeder hole, however, serves another purpose as well. While I have shown this lifter, in the drawing, to be removed slightly from the tip of the stem, normally hole 14 is completely sealed by the stem tip except when the pressure is relieved for a fraction of a second after the valve seats. At this moment a minute quantity of oil is bled out into the valve chamber 7, and this oil, together with the relatively small amount leaking past the lifter bearing, serves to lubricate the spring and stem. In like manner oil in small amount, leaking past the tappet bearing, serves to lubricate the tappet and the bearing of the tappet against the cam 19. Such lost oil is automatically replenished, as needed, through the check valve 31, thus insuring that the oil channel 15 is at all times full, this feature at all times eliminating any tappet clearance.

There are other features, however, inherent in the structure I have just described. For example, a mushroom tappet may be used to its maximum extent because the tappet is perfectly free to revolve without having to push up the valve mechanically at the same time wearing the lifter and valve stem in the meanwhile. In addition, advantage may be taken of a difference in lift between the tappet and lifter by making the respective diameters of different size. In the present preferred example the tappet moves about one-half as far as the lifter. Furthermore, the combined mass of the tappet, lifter and oil column is but a fraction of that of any mechanical system. Not only is valve stem clearance entirely eliminated, thus reducing the wear on the stem tip and tappet, but the valve itself is lifted straight up, removing all side strain from stem and valve. Furthermore, as the slack in the tappet is always being taken up, a new valve, even though the stem be as much as ⅛ of an inch too long or too short, can be slipped into place with no adjustment whatsoever; and as an incidental feature, austenitic steels can be used for the valve stems with great advantage, although such steels can not be used satisfactorily with mechanical systems because of a very large coefficient of expansion.

There is one more advantage, however, which should be pointed out in the present device, namely, that the spring chamber 7 can be sealed by the lifter 12. Heretofore engine designers have been content to run exhaust valve stems without lubrication, and to permit the exhaust gases escaping past the valve stem to enter the crank case. Furthermore, mechanical systems allow the intake suction to draw as much oil from the crank case as can pass the stems. It is very difficult, with mechanical lifters, to fit pressure-equalizing chambers around the stem guides and springs, but in my present invention this is a simple matter. The lifter pistons form the pressure seal, allowing the pressure in the spring chamber to equalize itself with that in the ports. With an exhaust valve the pressure will be low, depending on the back pressure of the exhaust pipes and muffler system. With the intake valve, however, the conditions are quite different, the pressure ranging from around 20 inches of mercury suction, with the engine idling at sea level; to around 20 inches of mercury pressure when supercharging at high altitude is used. With my present system, however, I control the lubrication of both the intake and exhaust stem, and insure against inward leakage of air or outwardly of mixture, throughout the wide range of intake pressures at the intake valve.

While I have described my device as being applied to a horizontal radial engine, it is obvious that the same structure can be applied, as described, to engines in any position, the main desideratum being only that there be a means for directing air bubbles from the filter screen into the main oil stream to be thereafter swept out of the system. It is possible then to eliminate the vertical pipes entirely and pass the main oil stream directly over the screens in such a manner that the oil bubbles are swept away from the vicinity of the screen before becoming large enough to block the screen.

I have also found that at least a pair of filter chambers 30 can be supplied by one vertical conduit 29, and I prefer to supply both valves of a single cylinder with a single vertical conduit, thus reducing oil piping to a minimum.

I claim:

1. In combination, a poppet valve having a stem, a closed chamber around the inner portion of said stem, a valve spring positioned within said chamber and connected to said valve stem for actuation of said valve, a valve lifter extending through the wall of said chamber contacting the end of said stem for actuation of said valve against spring action, said lifter entering said chamber through an oil-sealed bearing, and means for intermittently lubricating said lifter, stem, and spring through said lifter.

2. In combination, a poppet valve having a stem, a closed chamber around the inner portion of said stem, a valve spring positioned within said chamber and connected to said valve stem for actuation of said valve, a valve lifter extending through a wall of said chamber contacting the end of said stem for actuation of said valve against spring action, said lifter entering said chamber through an oil-sealed bearing, and means for supplying oil to said chamber through a conduit in said lifter, opening between the contact faces of said stem end and said lifter, said chamber being gas-tight except for leakage around said valve stem whereby entrance of oil to said chamber is controlled by leakage pressure, and passage of oil from said chamber lubricates said valve stem.

RALPH M. HEINTZ.